Sept. 12, 1933.   J. F. LEAHY   1,926,645
GEAR CUTTER
Original Filed July 11, 1928   2 Sheets-Sheet 1
*Fig.1.*
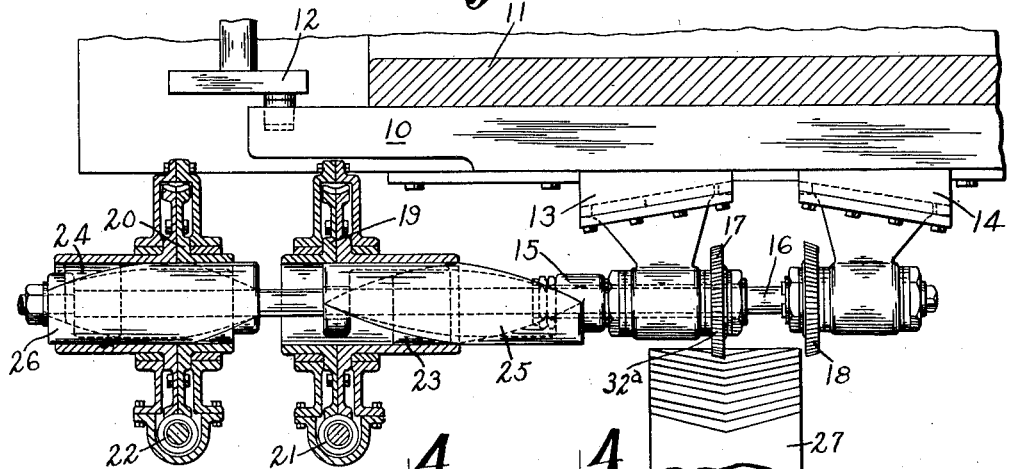
*Fig.2.*
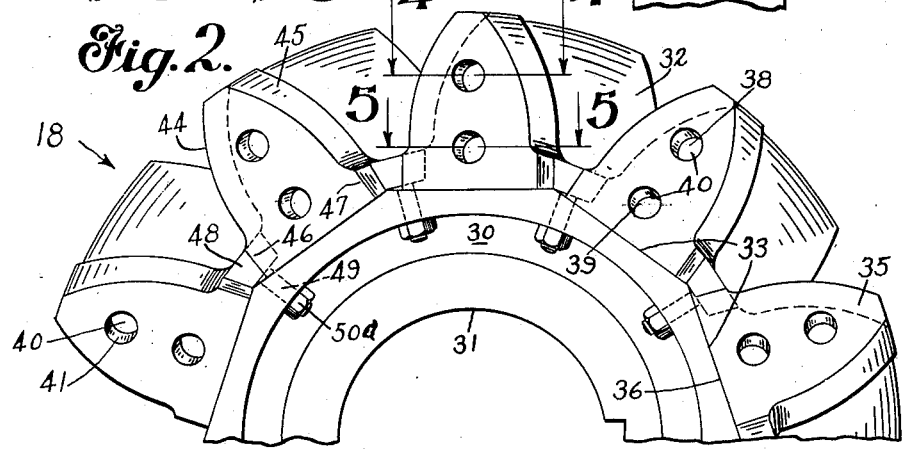
*Fig.3.*   *Fig.4.*   *Fig.5.*   *Fig.6.*
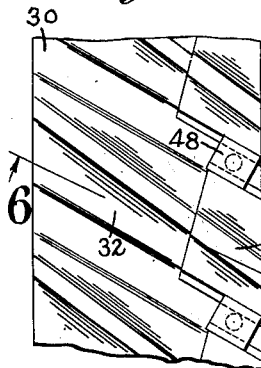 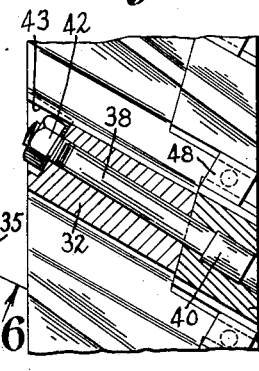 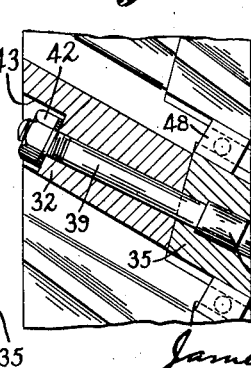 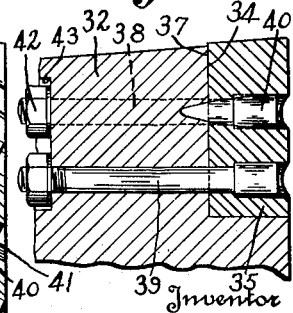
Inventor
James F. Leahy
By Rockwell & Bartholow
Attorneys Sept. 12, 1933. J. F. LEAHY 1,926,645
GEAR CUTTER
Original Filed July 11, 1928 2 Sheets-Sheet 2

Inventor
James F. Leahy
By Rockwell my Bartholow
Attorneys

Patented Sept. 12, 1933

1,926,645

UNITED STATES PATENT OFFICE 1,926,645

GEAR CUTTER

James F. Leahy, Buffalo, N. Y., assignor to Farrel-Birmingham Company, Inc., Buffalo, N. Y.

Application July 11, 1928. Serial No. 291,830
Renewed August 26, 1932

6 Claims. (Cl. 29—105)

This invention relates to involute gear tooth generating machines, using a master pinion cutter, and more particularly to an improvement in gear cutters of the pinion type adapted for use in this type of machine.

The cutters of this invention are in the form of a pinion gear, the contours of the teeth upon the periphery thereof being accurately generated by grinding the same after hardening. A cutter of this type is shown and described in Patent No. 1,668,345 issued to William E. Sykes and dated May 1st, 1928. Such cutters, like all cutting tools, such as milling cutters, hobs and shaper tools, and especially relatively large ones are expensive to make due to the care required in forming, hardening and grinding them. It is especially difficult, even with the best of equipment, to insure that each cutting edge will have the same degree of hardness and temper, the lack of which will result in uneven wear of the cutting edges, imposing a double burden on some of the teeth, and causing inaccuracies to appear in the shape of the article being cut.

The material of which these cutters are made is expensive, and errors during the making, breakage, or faults developing during the use thereof usually require that the entire cutter be replaced by a new one. The operator using such cutters and appreciating their value many times underestimates their strength and being unnecessarily cautious retards the speeds and feeds of the machine in which they are used, which lowers the production thereof and increases the cost of the article being produced.

One of the objects of this invention is to provide an improved gear cutter of the pinion type.

Another object of this invention is to provide a gear cutter which will be relatively inexpensive to manufacture and low in cost of upkeep.

Another object of this invention is to provide a gear cutter of the pinion type of such structure that the cutting edges may be thoroughly and uniformly hardened and tempered.

Still another object of this invention is to provide an improved gear cutter of this type, which will be economical to make because of its structure wherein there is a part which is substantially permanent, bearing of a relatively inexpensive and easily workable material, and other parts of relative expensive material but which may be produced in quantity and are individually replaceable when required.

A further object of this invention is to provide a cutter for gear cutting or the like, by the use of which the teeth of gears may be cut and accurately formed at relatively higher speeds than has heretofore been practicable.

A still further object of this invention is to provide in a gear cutter of the pinion type, a body part and cutting parts, the former being adapted to removably receive and firmly support the latter.

A still further object of this invention is to provide in a gear cutter of the pinion type, a body part having cutting parts removably supported thereby, and means to rigidly and individually secure said cutting parts to the body part.

To these and other ends, the invention consists in the novel features and combinations of parts to be hereinafter described and claimed.

In the accompanying drawings:

Fig. 1 illustrates somewhat diagrammatically, mechanism for operating a gear cutter embodying the features of this invention;

Fig. 2 is a partial front end view of a pinion type gear cutter, embodying the features of this invention;

Fig. 3 is a partial face view of the cutter shown in Fig. 1;

Fig. 4 is a section on line 4—4 of Fig. 2;

Fig. 5 is a section on line 5—5 of Fig. 2;

Fig. 6 is a section on line 6—6 of Fig. 3;

Figure 7:
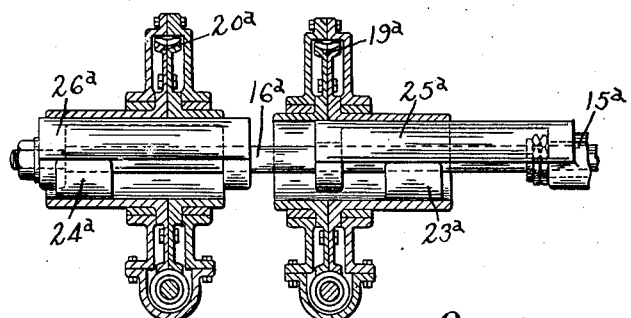
Fig. 7 illustrates a slight modification in the mechanism shown in Fig. 1, to adapt it to operate a somewhat different form of gear cutter.

The mechanisms diagrammatically shown in Figs. 1 and 7 illustrate the general arrangement of the cutter control and operating parts of a machine capable of cutting teeth in the faces of gear blanks by the principle of gear cutting known as involute gear generation, by means of a master pinion cutter. A detailed description of the structure, operation and method of cutting gears by this principle may be had by reference to the copending applications of William E. Sykes, Serial Nos. 641,126 and 164,825 filed respectively May 24, 1923 and January 31, 1927, which have matured into Patents No. 1,750,030 and No. 1,814,348 respectively.

Briefly, the action of the mechanism illustrated in Fig. 1, upon the cutters, is one wherein a combination of movements is provided. The carriage 10, slidably mounted in suitable ways in a frame 11, is reciprocable therein by means of a crank 12. Cutter spindle supports 13 and 14 carried upon and reciprocable with the carriage 10, support respectively cutter spindles 15 and 16. Cutters 17 and 18 are secured respectively to the spindles 15 and 16. The spindles 15 and 16 and the cutters thereon reciprocate with the supports 13 and 14 and are also rotatable relatively thereto, the spindles being rotatably mounted in bearings in their respective supports. Each spindle is slidably mounted within the sleeve-like hub of a worm wheel while being connected thereto for rotation therewith, thus spindle 15 may slide through and be rotated by worm wheel 19, and spindle 16 may slide through and be rotated by worm wheel 20. The worm wheels 19 and 20 are driven by worms 21 and 22, respectively.

The connection between the spindles 15 and 16 in Fig. 1, and the worm wheels, comprises the nuts 23 and 24, secured upon the interior of the sleeve-like hubs of the respective worm wheels, and cooperating guide members 25 and 26 secured to spindles 15 and 16 respectively. The guide members 25 and 26 are engaged by the nuts 23 and 24 respectively, and due to the helical form of the engaging surfaces of these parts operate to twist the spindles and cutters during the reciprocation thereof, as well as to cause rotation of the same when the respective worm wheels 19 and 20 are rotated.

During these operations, the teeth of a herringbone or double helical gear 27 will be generated and cut by the cutters 17 and 18. It will be understood that the reciprocating movement forces the cutters across the blank in the material thereof, that the continuous rotation of the cutters by means of the worm wheels causes them to rotate with the gear blank, which is rotated in synchronism therewith, whereby a true involute form of tooth is generated, and that the twist caused by the action of the guides and nuts during reciprocation controls the helical angle of the gear teeth being cut.

In Fig. 7, the nuts 23ᵃ and 24ᵃ, and guide members 25ᵃ and 26ᵃ do not require helical engaging surfaces, inasmuch as no twisting of the cutters is required, since spur gears having straight teeth are adapted to be cut by this mechanism. The spindles 15ᵃ and 16ᵃ, and the cutters secured thereto, of this mechanism, therefore reciprocate in a straight path while being rotated by the worm wheels 19ᵃ and 20ᵃ respectively.

The double helical gear cutters 17 and 18, as well as the spur gear cutter 28 must have their cutting edges of true form in order to correctly form involute gear teeth in the gear blank being cut, and be capable of withstanding the strains of being forced into the material of the gear blank at relatively fast speeds and feeds, in order to completely form the gear in a minimum amount of time, so that the production cost of the gear will not be prohibitively high.

To further increase the efficiency of this type of machine, the cutters should be capable of substantially continuous service, so that interruptions due to cutter breakage will not result in a serious loss of time. The teeth of the cutters should, therefore, be capable of being thoroughly and evenly hardened and tempered.

To obtain these advantageous results, cutters 17, 18 and 28 may be made according to the structures shown in the drawings. Fig. 2 shows a portion of one of a pair of cutters adapted to cut double helical teeth, and when used with a mechanism such as shown in Fig. 1, this particular cutter would be secured to spindle 16 and be the cutter shown at 18. This cutter has a disklike body portion 30, provided with a central spindle opening 31, and teeth 32 formed upon its periphery. The teeth 32 are cast or otherwise formed integral with the body portion 30 and are slightly reduced in dimensions such as width and height from those dimensions which would be required if these teeth were to act as the cutting means for the cutter. The body portion 30 and the teeth 32 thereon are preferably made from a steel casting or forging, which characteristically is tough and rugged, though easily worked into form by tools. One end face of each tooth 32 is cut back to form an outwardly directed series of shoulders 33, which are disposed one at the base of each tooth, and a series of forwardly facing end faces 34 disposed on the teeth and spaced rearwardly from the front end face of the body portion 30. The cutter 17 is provided with these same features, and differs only from cutter 18 in that the teeth 32ᵃ of cutter 17 are disposed at the left hand spiral angle while teeth 32 of cutter 18 are at a right hand spiral angle.

A cutting blade or plate 35 is disposed upon the end face of each tooth 32, with its base 36 resting upon the shoulder 33 and its rear end surface 37 abutting the end face 34 of each tooth. The blades 36 are secured adjacent the end face of each tooth 32, by means of bolts 38 and 39, the heads 40 of which are sunk into counterbores 41 in the front face of the blades 35 and the nuts 42 of which lie in counterbores 43, provided in the rear face of the teeth 32. Each blade 35 is peripherally extended at its base and at each side thereof beyond the edge of its sides 44 and 45, to provide clamping lugs 46 and 47. A wedge 48 having a threaded stud 49 secured thereto is disposed between each plate 35 and engages the side lugs of adjacent blades, and by means of a nut 50ᵃ threadingly engaged to the stud 49 is forced radially inwardly with respect to the center of the cutter to clamp the blades against the shoulders 33, and to support them peripherally. The nuts 50ᵃ are disposed in a recess formed in the face of the body portion, through the wall of and into which the studs 49 project.

The plates or blades 35 are substantially identical in form and size and are preferably made of relatively expensive high speed steel. Being substantially identical and comparatively small in size, the blades are relatively easy to uniformly harden and temper. They form the cutting blades of the cutter and are preferably roughed out to approximately the tooth shape, and after hardening and tempering are secured to the body portion 30, in which position they are finished (ground) to accurate form.

Should one of these blades or plates 35 become damaged in use, it may be readily removed and replaced by a new one or repaired without disturbing the others or affecting the body portion 30 in any manner.

Figure 8:
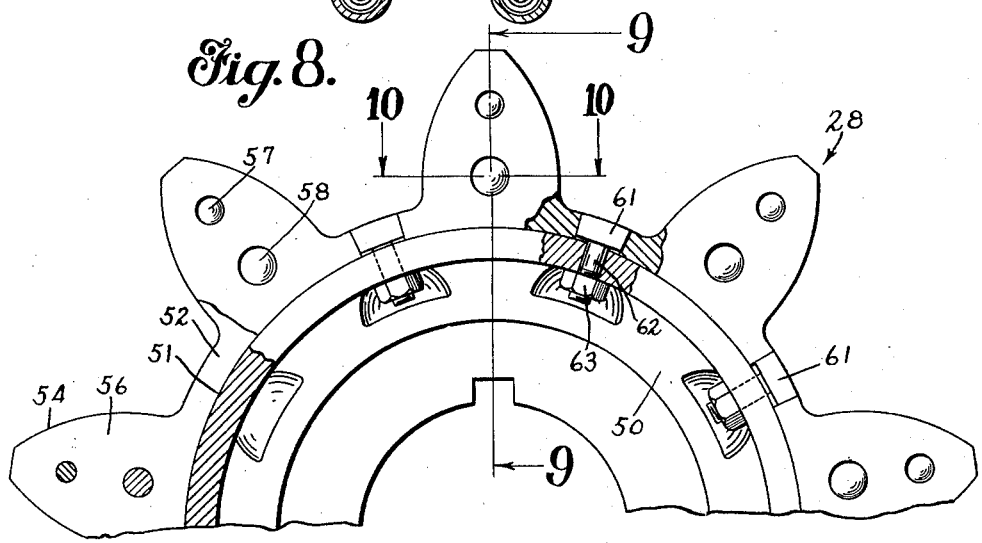
Fig. 8 is a partial front end view of a pinion type gear cutter of somewhat different form, but which also embodies the features of this invention.

Fig. 8 shows a portion of a cutter 28 for use in cutting the teeth of spur gears, adapted to be secured to either spindle 15ᵃ or 16ᵃ of the mechanism shown in Fig. 7. The body part 50 of this cutter is similar to the body part 30, in that it is preferably formed from the same kind of material, and serves the same general purpose. Its structure is somewhat different in that the shoulders at the bases of the teeth form in conjunction an outwardly and radially directed annular shoulder 51, and a forwardly facing shoulder 52, both of which extend continuously about the body part 50, the shoulder 51 being concentric to the body part.

A plurality of substantially similar cutting blades or plates 53 corresponding in number to the number of teeth 54 formed upon the body part 50, are spaced about and seat upon the shoulder 51, the base portion 55 of each blade being formed to fit the curve thereof. The blades 53 are each secured in abutting relation against the end face 56 of the tooth 54, and the forwardly facing shoulder 52, by means of bolts 57 and 58, the heads of which are seated in counterbores in the plates 53. The shanks of the bolts 57 and 58 pass axially through the teeth 54 and are threadingly engaged by nuts 59, whereby the blades 53 may be firmly clamped into place.

Figure 9:
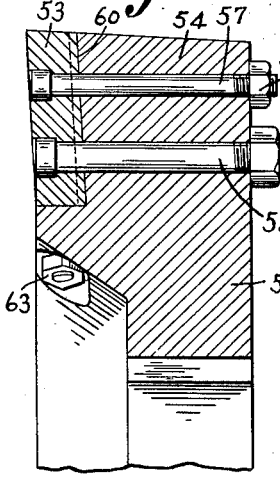
Fig. 9 is a section on line 9—9 of Fig. 8.
Figures 10, 11:
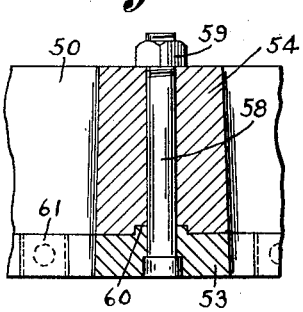
Fig. 10 is a section on line 10—10 of Fig. 8.
Fig. 11 is a section similar to Fig. 10, but of a somewhat modified form of cutter.
Figure 12:
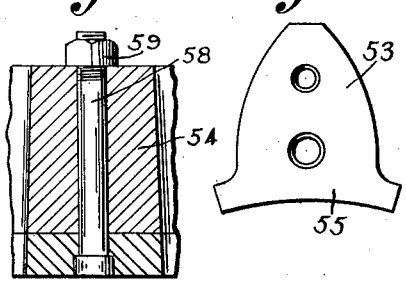
Fig. 12 is an end face view of a part of a cutter shown in Fig. 8.

The teeth 32 and 54 of the body portions 30 and 50 respectively, serve as backing members for the cutting blades 35 and 53, abutting as they do substantially the entire area of the rear face thereof. To insure that the cutting plates 53 will not slip or give sideways, a tongue and groove connection may be made between the rear face of each of the blades 53 and the front face of each tooth 54, as shown at 60 in Figs. 9 and 10, or this feature may be omitted as shown in Fig. 11. Obviously this tongue and groove feature could be applied to the form of tooth shown in Figs. 2 to 6 inclusive. Wedges 61 are disposed between the blades 53 and are formed and act as do the wedges 48 previously described, each having a stud member 62 engaged by a nut 63. The wedges 48 and 61 are preferably provided and used in the cutters in this invention, but by increasing the width peripherally of the base portions 36 and 55 of the plates 35 and 53 respectively, so that they will each engage the adjacent one, the wedges might be dispensed with.

By using the improved and novel structure above disclosed, a practical, rugged, and accurately operating composite cutter is provided and heavier cuts in a gear blank may be taken, and the machine employing them may be operated at higher speeds and feeds than has heretofore been possible when cutters made in one piece and known as solid cutters have been used. Less loss of time is experienced and the operator is inspired with confidence in using these cutters, because even under excessively heavy cuts the destruction or excessive damage to a relatively highly expensive tool is not possible, due to the structure whereby should one of the cutting blades be damaged another can readily be supplied, whereas in the case of a solid cutter the entire tool must be replaced.

The individual blades of the novel form of cutter of this invention cost but a small fraction of the cost of an entire cutter of the other form. It is possible with this form of cutter, wherein a plurality of blades similar in form and size are provided, to insure that the cutting edges will have the same degree of hardness and temper, and that, therefore, they will uniformly cut material which is of uniform hardness throughout. This results in even wear on the blades and imposes no double burden on some blades due to the failure of any one of them, which might cause inaccuracy in tooth contour to appear in the gear being cut.

While I have shown and described some preferred embodiments of my invention, it is understood that it is not to be limited to all of the details shown, but is capable of modification and variation which will lie within the spirit of the invention and within the scope of the appended claims.

What I claim is:

1. In a gear cutter of the pinion type, a body having teeth upon its periphery, the end face of each of said teeth being spaced from the side of the body to form an outwardly directed fixed shoulder on the body at the base of the tooth, cutting blades in the form of gear teeth seated directly on said shoulders, and means for urging the cutting blades radially inwardly against said shoulders.

2. In a gear cutter of the pinion type, a body having teeth upon its periphery, the end face of each of said teeth being spaced from the side of the body to form an outwardly directed fixed shoulder on the body at the base of the tooth, cutting blades in the form of gear teeth seated directly on said shoulders, and means between adjacent blades and engaging both thereof for spacing said cutting blades about said body and urging the same radially inwardly against said shoulders.

3. In a gear cutter of the pinion type, a body having teeth upon its periphery, the end face of each of said teeth being spaced from the side of the body to form an outwardly directed fixed shoulder on the body at the base of the tooth, cutting blades in the form of gear teeth seated directly on said shoulders, and means for spacing said cutting blades about said body and urging the same radially inwardly against said shoulders, said last named means including a plurality of wedges mounted between the cutting blades, the latter being provided with tangentially directed side edge faces against which the wedges bear.

4. A composite gear cutter of the pinion type comprising a body having teeth upon its periphery and underlying fixed shoulders having outwardly directed faces located adjacent the end faces of said teeth, cutting blades having their inner edges seated upon said shoulders and extending alongside the end faces of said teeth, each blade having holes extending completely therethrough at different distances from the center of the body and the corresponding tooth having holes that register with those of the blade, the holes in the blade being counterbored at the front face of the blade, and fastening bolts passing through the registering holes in each blade and tooth and having their ends disposed in the counterbores at the front face of the blade, said bolts being adapted to draw said blades in a direction generally lengthwise of the teeth against the end faces of the teeth and to prevent movement of the blades relatively to the teeth.

5. A composite gear cutter of the pinion type comprising a body having teeth upon its periphery, the end faces of said teeth at one side of the cutter being so located that there is presented an outwardly directed fixed shoulder at the base of each tooth, cutting blades lying against the end faces of said teeth and seated at their inner edges upon the outer faces of said shoulders, each blade having at a point spaced outwardly from the shoulder a hole extending through the blade from front to rear and the corresponding tooth having a through front-to-rear hole registering with that of the blade, the hole in the blade being counterbored at the front face of the blade, a fastening bolt for the blade passing through the registering holes in the blade and tooth and having a head within the counterbore at the front face of the blade and a nut at the rear face of the tooth, said bolt exerting pressure on the blade in a direction generally lengthwise of the tooth to clamp it against the end face of the tooth, and a second bolt spaced outwardly from the first and likewise passing through a front-to-rear hole in the tooth and engaging the blade at its outer part for securing it in position.

6. A composite gear cutter of the pinion type comprising a body having teeth upon its periphery and underlying fixed shoulders having outwardly directed faces located adjacent the end faces of said teeth, said outwardly directed faces being substantially parallel to the cutter axis, cutting blades having their inner edges seated upon said shoulders and extending alongside the end faces of said teeth, and means for securing each cutting blade in position comprising a bolt extending through the corresponding tooth and engaging the cutting blade to draw it against the end face of the tooth, said bolt being located adjacent the base of the blade, and a second bolt spaced outwardly from the first and acting on the blade to draw the blade in substantially the same direction.

JAMES F. LEAHY.